United States Patent [19]

Edwards

[11] Patent Number: 4,934,647
[45] Date of Patent: Jun. 19, 1990

[54] UNIVERSAL MOUNT

[75] Inventor: James S. Edwards, Lancaster, Calif.

[73] Assignee: Northrop Corporation, Los Angeles, Calif.

[21] Appl. No.: 391,810

[22] Filed: Aug. 9, 1989

[51] Int. Cl.5 ............................................. A47G 29/00
[52] U.S. Cl. .................................... 248/371; 248/179; 248/421; 248/346; 248/287; 108/10
[58] Field of Search ............... 248/371, 178, 179, 287, 248/650, 678, 398, 346, 919, 920, 921, 922, 923, 421, 419, 284, 291, 184, 185; 108/145, 138, 10, 144

[56] References Cited

U.S. PATENT DOCUMENTS

| | | | |
|---|---|---|---|
| 730,830 | 6/1903 | Lingle | 248/179 X |
| 801,614 | 10/1905 | Sebastian | 248/421 X |
| 1,381,837 | 6/1921 | Hopaidaszka | 248/421 X |
| 1,480,651 | 1/1924 | Bailey | 248/179 |
| 1,550,944 | 8/1925 | Beidler et al. | 248/421 X |
| 1,986,035 | 1/1935 | Wells | 248/421 X |
| 2,452,216 | 10/1948 | Yarber | 108/6 |
| 3,289,612 | 12/1966 | Mouw | 108/8 X |
| 3,358,951 | 12/1967 | Carter | 248/650 |
| 3,421,457 | 1/1969 | Taylor et al. | 108/4 |
| 4,687,170 | 8/1987 | Beaver | 248/419 X |
| 4,744,712 | 5/1988 | Mitchell | 248/421 X |

FOREIGN PATENT DOCUMENTS 632261 10/1927 France ........................... 248/178

Primary Examiner—Ramon S. Britts
Assistant Examiner—Karen J. Chotkowski
Attorney, Agent, or Firm—Terry J. Anderson; Robert B. Block

[57] ABSTRACT

An improved universal mount system for receiving a sensing device positionable in a plurality of locations and orientations comprising in combination a base having a plurality of threaded leveling lugs extending therethrough for independent adjustment of the corners of the base, the base also having upwardly extending plates with apertures therethrough; a table having a pair of downwardly depending plates each with an arcuate slot and a thumb bolt extending therethrough into the aperture of an adjacent upwardly extending plate for tilting of the table with respect to the base; and a platform having an instrument mounting bolt extending through an elongated slot for mounting of an instrument to the platform, the platform also including a linkage for coupling parallel upper and lower plates for elevational adjustment purposes.

5 Claims, 2 Drawing Sheets

UNIVERSAL MOUNT

BACKGROUND OF THE INVENTION

This invention relates to a universal mount and, more particularly, to apparatus for mounting data gathering devices or the like at any one of a number of locations and orientations.

DESCRIPTION OF THE BACKGROUND ART

In the design and testing of manned equipment, it is frequently necessary to utilize a camera, photometer or other data gathering device within the equipment to predict the capabilities of a human operator within the final product. To this end, a camera is utilized to simulate the eyes of the human operator. Under such circumstances, the camera must be capable of being positioned at locations and orientations to simulate the eyes of the operator. The camera must thus be capable of being supported in a fixed location and at a fixed orientation within a wide variety of locations and orientations.

Various approaches are disclosed in the literature to improve mounting equipment. By way of example, note U.S. Pat. No. 3,115,849 to Johnson which discloses a support table for projectors or the like wherein the projector may be supported at any one of a plurality of heights or angles. Adjustable drafting tables are normally capable of locational and orientational positioning. Examples of such drafting tables are disclosed in a large number of patents, as for example, U.S. Pat. No. 1,381,837 to Hopaidaszka; U.S. Pat. No. 2,452,216 to Yarber; U.S. Pat. No. 2,581,023 to Jerick; U.S. Pat. No. 2,982,050 to May and U.S. Pat. No. 3,675,594 to Kritske. Other tables having adjustment features are disclosed in U.S. Pat. No. 3,421,457 to Taylor and U.S. Pat. No. 3,606,450 to Sedgwick. Analogous adjustment mechanisms can also be found in other arts such as easels, sunshades and lift carts. Note U.S. Pat. No. 3,199,825 to Bellows; U.S. Pat. No. 3,289,612 to Mouw and U.S. Pat. No. 4,249,749 to Collier.

Although many such advances are noteworthy to one extent or another, none achieves the objectives of an efficient, reliable, inexpensive, convenient to use equipment to accommodate the needs of a wide variety of mounting needs.

As illustrated by the great number of prior patents and known mounting mechanisms, efforts are continuously being made in an attempt to improve locating and orienting mechanisms to render them more efficient, convenient, reliable and economical. None of these previous efforts, however, provides the benefits attendant with the present invention. Additionally, prior techniques do not suggest the present inventive combination of component elements as disclosed and claimed herein. The present invention achieves its intended purposes, objectives and advantages over the prior art devices through a new, useful and unobvious combination of component elements, which is simple to use, with the utilization of a minimum number of functioning parts, at a reasonable cost to manufacture, and by employing only readily available materials.

Therefore, it is an object of this invention to provide an improved universal mount system for receiving a sensing device positionable in a plurality of locations and orientations comprising in combination a base having a plurality of threaded leveling lugs extending therethrough for independent adjustment of the corners of the base, the base also having upwardly extending plates with apertures therethrough; a table having a pair of downwardly depending plates each with an arcuate slot and a thumb bolt extending therethrough into the aperture of an adjacent upwardly extending plate for tilting of the table with respect to the base; and a platform having an instrument mounting bolt extending through an elongated slot for mounting of an instrument to the platform, the platform also including a linkage for coupling parallel upper and lower plates for elevational adjustment purposes.

It is another object of this invention to position sensing devices at any one of a wide variety of locations and orientations.

It is a further object of the invention to readily adjust the location and orienting of a support member for sensing apparatus.

The foregoing has outlined some of the more pertinent objects of the invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claim with the specific embodiment shown in the attached drawings. For the purpose of summarizing the invention, the invention may be incorporated into an improved universal mount system with ten degrees of freedom for receiving and supporting an optical sensing device comprising in combination a base having a threaded aperture in each corner and a threaded leveling lug extending through each aperture, each leveling lug being capable of adjustment independent of the remaining leveling lugs, the frame further having a pair of upwardly extending plates each with an aperture therethrough; a table having a pair of downwardly depending plates, the downwardly depending plates each having an arcuate slot with thumb bolts extending through the slots into the apertures of the upwardly extending plates of the base for adjustable tilting of the table in a lockable position; an instrument receiving platform having an upper and lower plate and with a slot and mounting bolt extending through the upper plate, the mounting bolt having a threaded shaft upwardly extending through the slot for mounting of the camera to the upper plate, and a four bar linkage adjustably coupling the lower plate and the upper plate, the four bar linkage having a first transverse bar and a second transverse bar, the first and second transverse bars having aligned threaded apertures for receiving a screw jack, the screw jack having a rotatable handle for effecting upward or downward movement of the upper plate; and a plurality of downward depending wheels depending from the lower plate for positioning in a plurality of laterally extending slots on the upper surface of the table for effecting linear motion of the platform from side to side of the table, the lower plate also having a threaded aperture for receiving a locking lug for precluding motion of the platform on the table.

The invention may also be incorporated into a universal mount system for receiving a sensing device positionable in a plurality of locations and orientations comprising in combination a base having a plurality of threaded leveling lugs extending therethrough for independent adjustment of the corners of the base, the base also having upwardly extending plates with apertures therethrough; a table having a pair of downwardly depending plates each with an arcuate slot and a thumb bolt extending therethrough into the aperture of a adjacent upwardly extending plate for tilting of the table with respect to the base; and a platform having an instrument mounting bolt extending through an elongated slot for mounting of an instrument to the platform, the platform also including a linkage for coupling parallel upper and lower plates for elevational adjustment purposes. The linkage includes a pair of four bar arrangements, one on each side of the platform, coupled at their upper ends to rails depending from the upper plate and at their lower ends to rails upstanding from the lower plate. The system further includes slots in the rails for receiving pins from their adjacent bars. The system further includes thumb bolts associated with the slots at diametrically opposed bars for locking purposes.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific embodiment may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in conjunction with the accompanying drawings in which.

Similar referenced characters refer to similar parts throughout the Figures.

DETAILED DESCRIPTION OF THE INVENTION

Figure 1:
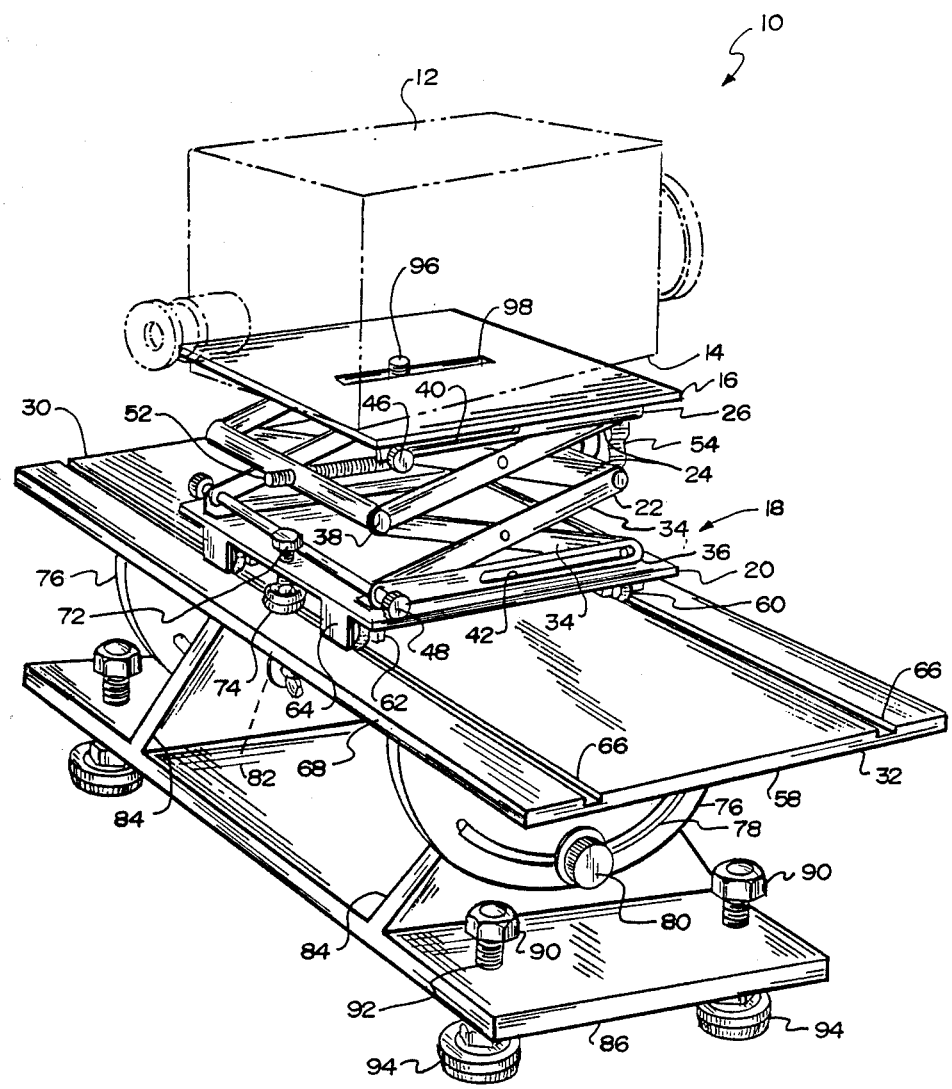
FIG. 1 is a perspective illustration of a ten degree of freedom universal mount constructed in accordance with the principles of the present invention.

With reference to FIG. 1, there is shown a ten degree of freedom universal mount system 10 supporting a sensing device 12 for data gathering purposes. Once installed on the universal mount 10, the precise positioning and orienting of the sensing device 12, shown for illustrative purposes as a camera 12, is effected by pointing it in the proper direction. Retention of the position is easily accomplished through adjustment of various thumb screws controlling the various components of the mount 10. The sensing device 12 disclosed in the preferred embodiment is a camera, but a wide variety of other devices such as a photometer or the like could be employed in association with the present invention.

The camera 12 is supported on its flat lower surface 14 upon a flat upper support plate 16 of the system. The upper extent of the system is a platform 18 formed of two parallel plates 16 and 20, an upper plate 16 upon which the camera is supported and a lower plate 20. The upper and the lower plates are coupled with respect to each other by two pair of four bar linkages 22, one on each side of the plates. Since each of the four bar linkages is identical to the other, only one of such linkages will be described.

The upper ends of the upper bars 24 are pivotally coupled to a lower rail 26 depending from the lower surface of the upper plate 16, parallel with the sides 30 and 32 of the system. The lower ends of the upper bars 24 are pivotally coupled to the upper ends of the lower bars 34 with the lower bars pivotally coupled to an upper rail 36, upstanding from the upper surface of the lower plate 20. The upper bars 24 and the lower bars 34 are pivotally coupled at their central extents by pins 38. The lower end of one of the lower bars and a diametrically opposed upper end of one of the upper bars are supported for sliding motion in parallel slots 40 and 42 of the depending and upstanding rails 26 and 36 of the upper and lower plates. In this manner, the four bar linkage 22 acts in a scissor-like arrangement for allowing a raising and lowering movement of the upper plate 16 with respect to the lower plate 20 while maintaining parallelism at all times.

A thumb screw 46 is located in a threaded end of the bar in the upper slot 40 for securing the elevational position of the upper plate 16 and the four bar linkage 22 with respect to the lower plate 20. Similarly, a threaded end of a rod extending through a lower end of a lower bars 34 functions with a thumb screw 48 for securing the plates with respect to each other. As such, a predetermined distance between the upper and lower plates 16 and 20 can be established and maintained. A threaded jack screw 52 extends through members between the upper two bars 34 and the lower two bars at their area of contact. Rotation of the jack screw handle 54 in one direction or another will bring the lower ends of the upper bars 24 and the upper ends of the lower bars 34 toward or away from each other for the fine adjustment of the distance between the upper and lower plates 16 and 20 and hence the height of the camera 12 with respect to the surface upon which it is located.

The platform 18 is coupled to a planar table 58 which constitutes an intermediate portion of the system. The platform 18 and table 58 are coupled by rotatable wheels 60 secured by pins 6 extending through the wheels into depending plates 64 secured beneath the lower surface of the lower plate 20 of the platform 18. The table 58 is provided with slots 66 parallel with the front 68 and back 70 of the table 58 and extending from side 30 to side 32 thereof. As such, the platform 18 and camera 12 are free to move side 30 to side 32 on the table 58 to laterally reposition the platform 18 and camera 12 with respect to the system 10. A thumb screw 72 extends through the lower plate 20 adjacent the front edge 68 of the table 58. It is provided with an elastomeric cap 74 for frictionally securing the platform 18 with respect to the table 58 in its intended position. The movement of platform 16 and camera 12 may thus be fixedly positioned from side to side of the table 58 and the system 10.

Rotational motion and orientation of the table 58, platform 18 and camera 12 is effected through depending plates 76 secured to the lower face of the table 58. The plates are semi-circular in configuration with concentric slots 78. A threaded thumb screw 80 received in a wing nut extends through each slot 78 and is secured in releasable engagement in apertures 82 extending through upstanding plates 84 secured to the upper surface of the base 86. Unscrewing of the thumb screws 80 allows for rotation of the table 18, platform 18 and camera 12. Conversely, tightening of the thumb screw 80 effects the securement of the table 58, platform 18 and the camera 12 in a proper, intended rotational orientation with respect to the base 86 and its supporting surface.

The last degree of motion of the system is effected through thumb screws 90 functioning as leveling lugs secured in threaded apertures 92 at the four corners of the base. Elastomeric caps 94 on the ends of the thumb screws 90 extending through the base 86 to allow for all four corners of the base 86 to be independently raised and lowered. Such motion allows for the tilting of the base 86, table 58, platform 18 and camera 12 from side to side or front to back or any angular position therebetween. Such motion also allows for a limited degree of elevational movement of the system 10 and camera 12 with respect to a supporting structural component elements therebeneath.

Upstanding through the upper plate 16 of the platform 18 is a thumb screw 96 positionable in a slot 98 parallel with the sides 30 and 32 of the system 10 and extending from front to back. This thumb screw 96 is adapted to be threadedly received in the lower surface 14 of the camera 12 to allow for rotation of the camera about an axis perpendicular to the upper plate 16 of the platform 18. A full three hundred sixty (360) degree rotation may be effected for maximum rotational orienting of the camera 12. The elongated nature of the slot 98 also allows for movement of the entire camera 12 from front 68 to back 70 of the entire system 10.

Figure 2:
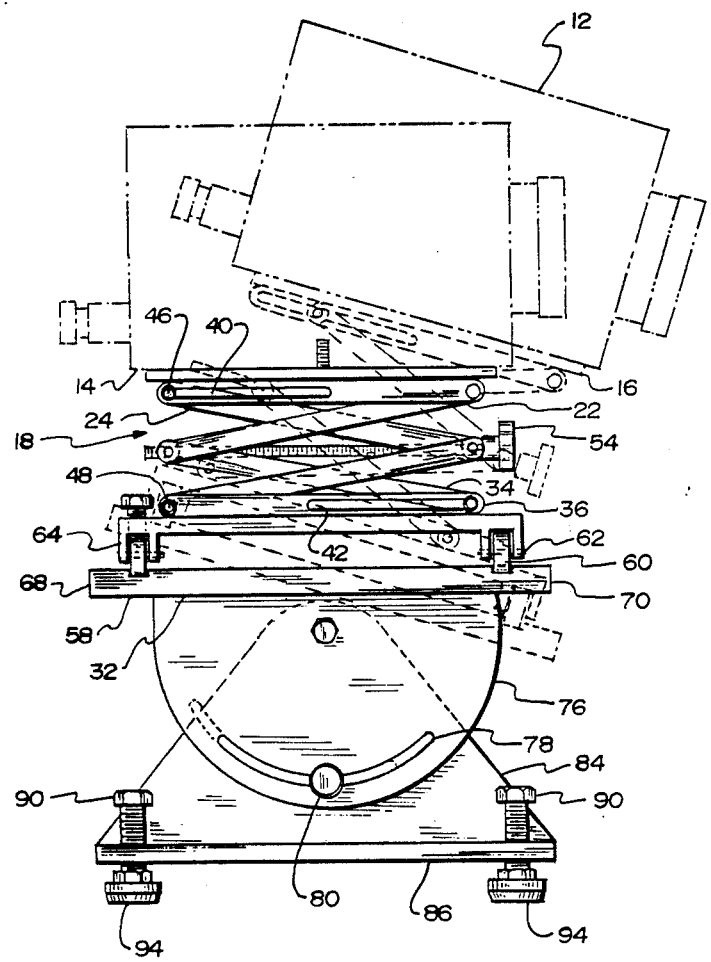
FIG. 2 is a side elevational view of the apparatus of FIG. 1 illustrating alternate loations and orientations of the supported camera.

FIG. 1 illustrates in a perspective showing the system of the present invention in one particular location and orientation. FIG. 2 shows in a side elevational view the system, in solid line showing, the same system. In dashed line, however, various components have been repositioned and secured whereby the system and camera are in an alternate location and orientation.

It can thus be seen that the system 10 allows for ten degree, essentially universal, positioning and orienting of the camera 12. The ten degree freedom movement includes:
1. Raising the platform and camera.
2. Lowering the platform and camera.
3. Forward movement of the camera on the platform.
4. Rearward movement of the camera on the platform.
5. Three-hundred and sixty (360) degree rotational movement of the camera.
6. Adjustable tilting angle of the platform and table with respect to the base.
7. Lateral movement of the table in one direction.
8. Lateral movement of the table in a second direction.
9. A left tilting motion of the system upon its support.
10. A right tilting motion of the system upon its support.

The present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,
What is claimed is:

1. A universal mount system with ten degrees of freedom for receiving and supporting an optical sensing device comprising in combination:

a base having a threaded aperture in each corner and a threaded leveling lug extending through each aperture, each leveling lug being capable of adjustment independent of the remaining leveling lugs, the frame further having a pair of upwardly extending plates each with an aperture therethrough;

a table having a pair of downwardly depending plates, the downwardly depending plates each having an arcuate slot with thumb bolts extending through the slots into the aperture of the upwardly extending plates of the base for adjustable tilting of the table in a lockable position;

an instrument receiving platform having an upper and lower plate and with a slot and mounting bolt extending through the upper plate, the mounting bolt having a threaded shaft upwardly extending through the slot for mounting of the camera to the upper plate, and a four bar linkage adjustably coupling the lower plate and the upper plate, the four bar linkage having a first transverse bar and a second transverse bar, the first and second transverse bars having aligned threaded apertures for receiving a screw jack, the screw jack having a rotatable handle for effecting upward or downward movement of the upper plate; and a plurality of downward depending wheels depending from the lower plate for positioning in a plurality of laterally extending slots on the upper surface of the table for effecting linear motion of the platform from side to side of the table, the lower plate also having a threaded aperture for receiving a locking lug for precluding motion of the platform on the table.

2. A universal mount system for receiving a sensing device positionable in a plurality of locations and orientations comprising in combination:

a base having a plurality of threaded leveling lugs extending therethrough for independent adjustment of the corners of the base, the base also having upwardly extending plates with apertures therethrough;

a table having a pair of downwardly depending plates each with an arcuate slot and a thumb bolt extending therethrough into the aperture of an adjacent upwardly extending plate for tilting of the table with respect to the base; and a platform having an instrument mounting bolt extending through an elongated slot for mounting of an instrument to the platform, the platform also including a linkage for coupling parallel upper and lower plates for elevational adjustment purposes.

3. The system as set forth in claim 2 wherein the linkage includes a pair of four bar arrangements, one on each side of the platform, coupled at their upper ends to rails depending from the upper plate and at their lower ends to rails upstanding from the lower plate.

4. The system as set forth in claim 3 and further including slots in the rails for receiving pins from their adjacent bars.

5. The system as set forth in claim 4 and further including thumb bolts associated with the slots at diametrically opposed bars for locking purposes.

* * * * *